(12) United States Patent
King et al.

(10) Patent No.: US 9,000,614 B2
(45) Date of Patent: Apr. 7, 2015

(54) SYSTEM FOR MULTIPLE ENERGY STORAGE AND MANAGEMENT AND METHOD OF MAKING SAME

(75) Inventors: Robert Dean King, Schenectady, NY (US); Paul Robert Gemin, Niskayuna, NY (US); Irene Michelle Berry, Schenectady, NY (US)

(73) Assignee: General Electric Company, Schenectady, NY (US)

(*) Notice: Subject to any disclaimer, the term of this patent is extended or adjusted under 35 U.S.C. 154(b) by 687 days.

(21) Appl. No.: 13/283,829

(22) Filed: Oct. 28, 2011

(65) Prior Publication Data

US 2012/0038214 A1  Feb. 16, 2012

Related U.S. Application Data

(63) Continuation-in-part of application No. 13/224,669, filed on Sep. 2, 2011, which is a continuation of application No. 12/539,056, filed on Aug. 11, 2009, now Pat. No. 8,026,638.

(51) Int. Cl.
| | |
|---|---|
| H02J 1/00 | (2006.01) |
| H02J 5/00 | (2006.01) |
| B60L 11/18 | (2006.01) |
| B60L 11/00 | (2006.01) |
| B60L 11/12 | (2006.01) |
| H02J 7/00 | (2006.01) |
| H02J 7/34 | (2006.01) |
| H02M 3/155 | (2006.01) |

(52) U.S. Cl.
CPC ........... *B60L 11/1803* (2013.01); *B60L 11/005* (2013.01); *B60L 11/126* (2013.01); *B60L 11/1816* (2013.01); *B60L 11/1853* (2013.01); *B60L 11/1868* (2013.01); *B60L 2210/14* (2013.01); *B60L 2210/40* (2013.01); *H02J 7/0013* (2013.01); *H02J 7/345* (2013.01); *H02M 3/155* (2013.01); *Y02T 10/6217* (2013.01); *Y02T 10/7005* (2013.01); *Y02T 10/7022* (2013.01); *Y02T 10/7055* (2013.01); *Y02T 10/7077* (2013.01); *Y02T 10/7088* (2013.01); *Y02T 10/7225* (2013.01); *Y02T 90/121* (2013.01); *Y02T 90/127* (2013.01); *Y02T 90/14* (2013.01); *Y02T 10/7241* (2013.01); *Y02T 10/7066* (2013.01)

(58) Field of Classification Search
USPC .............................................. 307/45, 46, 77
See application file for complete search history.

(56) References Cited

U.S. PATENT DOCUMENTS

| | | | |
|---|---|---|---|
| 5,373,195 | A | 12/1994 | De Doncker et al. |
| 5,710,699 | A | 1/1998 | King et al. |
| 5,903,449 | A | 5/1999 | Garrigan et al. |
| 6,331,365 | B1 | 12/2001 | King |
| 6,737,822 | B2 | 5/2004 | King |
| 7,049,792 | B2 | 5/2006 | King |
| 2004/0100149 | A1 | 5/2004 | Lai |
| 2006/0125319 | A1 | 6/2006 | King et al. |
| 2007/0158118 | A1 | 7/2007 | King |
| 2007/0164693 | A1 | 7/2007 | King et al. |
| 2008/0113268 | A1 | 5/2008 | Buiel et al. |

*Primary Examiner* — Hal Kaplan
(74) *Attorney, Agent, or Firm* — Ziolkowski Patent Solutions Group, SC; Jean K. Testa (57) ABSTRACT

A system for multiple energy storage and management includes a propulsion system includes an electric drive and a direct current (DC) link electrically and a first energy storage system coupled to the electric drive. The first energy storage system includes a low specific-power energy storage device (ESD). A coupling device is coupled to a first terminal of the low specific-power ESD and a second energy storage system, wherein a first terminal of the second energy storage system is electrically coupled to the electric drive through the DC link and a second terminal of the second energy storage system is coupled to the coupling device. A boost converter assembly is coupled to the first and second energy storage systems. The coupling device couples the second terminal of the second energy storage system to the first terminal of the low specific-power ESD in a series connection that bypasses the boost converter assembly.

24 Claims, 7 Drawing Sheets

SYSTEM FOR MULTIPLE ENERGY STORAGE AND MANAGEMENT AND METHOD OF MAKING SAME

CROSS-REFERENCE TO RELATED APPLICATION

The present application is a continuation-in-part of and claims priority to U.S. patent application Ser. No. 13/224,669 filed Sep. 2, 2011, which claims priority to U.S. patent application Ser. No. 12/539,056 filed Aug. 11, 2009, now U.S. Pat. No. 8,026,638 issued on Sep. 27, 2011, the disclosures of which are incorporated herein.

BACKGROUND

Embodiments of the invention relate generally to drive systems, and more specifically to battery powered drive systems such as those used in battery-powered electric vehicles or hybrid vehicles.

Recently, electric vehicles and hybrid electric vehicles have become increasingly popular. These vehicles are typically powered by one or more batteries, either alone or in combination with an internal combustion engine. In electric vehicles, the one or more batteries power the entire drive system, thereby eliminating the need for an internal combustion engine. Hybrid electric vehicles, on the other hand, include an internal combustion engine to supplement the battery power, which greatly increases the fuel efficiency of the vehicle.

Traditionally, the electric and hybrid electric propulsion systems in these vehicles use large batteries, ultracapacitors, flywheels, or a combination of these elements so as to provide sufficient energy to power the electric motor. While generally effective, the size and weight of the elements reduced the overall efficiency of the propulsion system and presented challenges for integration into the vehicles themselves.

Another challenge related to conventional electric propulsion systems is that the nominal voltage of the energy storage units (i.e., batteries and/or ultracapacitors) set the overall system voltage. Thus, the energy available to power the electric motor was limited to the energy available in the energy storage units themselves. Such a configuration limits the overall reliability and efficiency of the electric propulsion system, as the voltage demands of the electric motor were often far greater than the energy storage unit voltage. To combat this issue, a bi-directional boost converter may be used to decouple the energy storage unit voltage from a direct current (DC) link voltage, wherein the DC link is coupled to the electric motor. The bi-directional boost converter acts to increase, or "boost", the voltage provided from the energy storage unit to the DC link to meet the power demands of the electric motor. In fact, the ratio of the DC link voltage to the energy storage unit voltage is typically greater than 2:1. The bi-directional boost converter enables such an increase in voltage supplied to the DC link without the need for an increase in the size of the energy storage unit or units.

While the bi-directional boost converter successfully allows for an increased supply of voltage to the DC link without a corresponding increase in size of the energy storage unit(s), the efficiency of the bi-directional boost converter degrades during certain operating modes. In particular, during high-speed and high-power acceleration and deceleration of the vehicle, the ratio of DC link voltage to battery voltage is often greater than 2.5:1. Under these operating modes, the level of electrical current to which the components of the boost converter are subjected is very high, and therefore there is a subsequent need for proper thermal design to dissipate heat in the power electronic components of the boost converter. This thermal cycling stress on the components of the bi-directional boost converter may reduce reliability as well as overall system efficiency.

Furthermore, during high-speed and high-power deceleration, a concept known as "regenerative braking" enables power at potentially relatively high voltage generated by the electric motor to be cycled back through the bi-directional boost converter for storage in the energy storage unit(s). However, at high DC link voltage to battery voltage ratios, high losses within the bi-directional boost converter call for proper heat dissipation in the electrical components. Also, the regeneration power provided to the energy storage unit is often limited by the charge acceptance of the energy storage unit itself, which further reduces the efficiency of the system.

Therefore, it is desirable to provide an electric and/or hybrid electric propulsion system having greater overall system efficiency along with an increased level of energy capture during high-power regenerative braking.

BRIEF DESCRIPTION OF THE INVENTION

In accordance with one aspect of the invention, a propulsion system includes an electric drive, a direct current (DC) link electrically coupled to the electric drive, and a first energy storage system electrically coupled to the electric drive, wherein the first energy storage system includes a low specific-power energy storage device. The system also includes a coupling device coupled to a first terminal of the low specific-power energy storage device and a second energy storage system, wherein a first terminal of the second energy storage system is electrically coupled to the electric drive through the DC link and a second terminal of the second energy storage system is coupled to the coupling device. A boost converter assembly is coupled to the first energy storage system and to the second energy storage system. The coupling device is configured to couple the second terminal of the second energy storage system to the first terminal of the low specific-power energy storage device in a series connection and the series connection bypasses the boost converter assembly.

In accordance with another aspect of the invention, a method of assembling a control system includes coupling a low specific-power energy battery to a coupling device, coupling a second energy storage system to an electric drive through a direct current (DC) link, and coupling a boost converter to the coupling device, to the second energy storage system, and to the DC link. The method also includes connecting a terminal of the low specific-power energy battery in series with a terminal of the second energy storage system via the coupling device such that the connection between the terminal of the low specific-power energy battery and the terminal of the second energy storage system bypasses the boost converter when the coupling device is in a coupling state configured to couple the low specific-power energy battery to the second energy storage system.

In accordance with another aspect of the invention, an energy storage arrangement for an electrically powered system includes a first energy storage system comprising at least a low specific-power energy storage device and a boost converter coupled to the first energy storage system via a coupling device on a low-voltage side of the boost converter. A second energy storage system coupled to the boost converter on a high-voltage side the boost converter is also included, wherein the second energy storage system is further coupled in a series connection with the low specific-power energy storage device via a coupling device such that the series connection between the second energy storage system and the low specific-power energy storage device bypasses the boost converter.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

A system is shown to include an electric drive, a first energy storage system comprising at least a high specific-power energy storage device, such as an ultracapacitor, and a second energy storage system electrically coupled to the electric drive through a direct current (DC) link. Both the first energy storage system and the second energy storage system are electrically coupled to a multi-channel bi-directional boost converter. Furthermore, the positive terminal of the high specific-power energy storage device is also coupled to the negative terminal of the second energy storage system to bypass the multi-channel bi-directional boost converter. Such a connection between the high specific-power energy storage device and the second energy storage device enables a high voltage level to be provided to the electric drive during acceleration, as well as an increased capability for energy capture in the first energy storage system during regenerative braking events.

Figure 1:
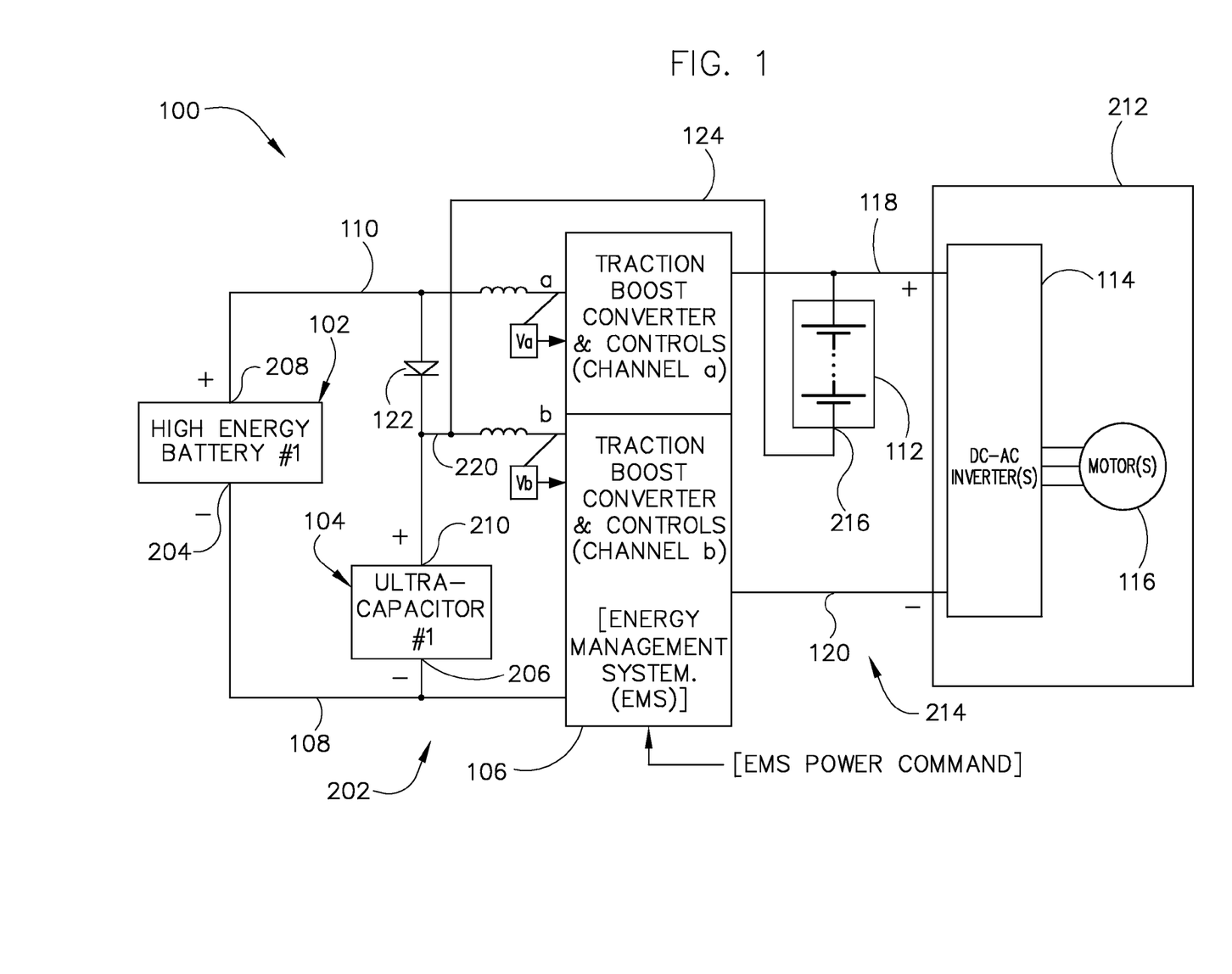
FIG. 1 schematically illustrates a propulsion system according to an embodiment of the invention.

Referring to FIG. 1, a propulsion system 100 according to an embodiment of the invention is shown. Propulsion system 100 includes, in part, a first energy storage system comprising an energy battery 102 and a high specific-power energy storage device 104. Propulsion system 100 also includes a multi-channel bi-directional boost converter 106. High specific-power energy storage device 104 may be, for example, an ultracapacitor. In this case, an ultracapacitor represents a capacitor comprising multiple capacitor cells coupled to one another, where the capacitor cells may each have a capacitance that is greater than 500 Farads. The term energy battery used in the embodiments shown in FIGS. 1-3 describes a high specific-energy battery or high energy density battery demonstrated to achieve an energy density on the order of 100 W-hr/kg or greater (e.g., a Li-ion, sodium-metal halide, sodium nickel chloride, sodium-sulfur, zinc-air, nickel metal halide, or lead acid battery, or the like). Energy battery 102 and high specific-power energy storage device 104 are coupled together on a low-voltage side 202 of multi-channel bi-directional boost converter 106, wherein a negative terminal 204 of energy battery 102 and a negative terminal 206 of high specific-power energy storage device 104 are coupled to a bus 108, while a positive terminal 208 of energy battery 102 is coupled to a bus 110, which is a positive bus that connects through an inductor to one channel of multi-channel bi-directional boost converter 106 on the low-voltage side 202 of multi-channel bi-directional boost converter 106. A positive terminal 210 of high specific-power energy storage device 104 is coupled to a bus 220, which is coupled through an inductor on the low-voltage side 202 at a second channel (b) of multi-channel bi-directional boost converter 106.

System 100 further includes a second energy storage system, which comprises an energy storage device 112, and an AC traction drive 212, which includes a DC-AC inverter 114 and an AC motor 116 coupled to a high-voltage side 214 of multi-channel bi-directional boost converter 106. Energy storage device 112 may be, for example, a battery having a high specific-power rating (e.g., having a power density of 350 W/kg or greater). Alternatively, energy storage device 112 may also be an ultracapacitor. AC traction drive 212, in an alternative embodiment, may be replaced by a DC traction drive (not shown) by replacing inverter 114 with a DC chopper (not shown) and by replacing AC motor 116 with a DC motor (not shown). Energy storage device 112 is coupled with multi-channel bi-directional boost converter 106 via a positive DC link 118. DC-AC inverter 114 is also coupled to positive DC link 118 and a negative DC link 120, through which DC-AC inverter 114 receives a DC voltage and then supplies an alternating current to AC motor 116. Negative DC link 120 typically has the same potential as bus 108 on low-voltage side 202 of multi-channel bi-directional boost converter 106.

During typical operation, multi-channel bi-directional boost converter 106 acts to boost the voltage provided by low-voltage side 202 of system 100 to high-voltage side 214 of system 100, as well as to regulate the voltage and provide over-current protection to energy battery 102, high specific-power energy storage device 104, and energy storage device 112. While energy storage device 112 (or the combination of energy storage device 112 and high specific-power energy storage device 104) is generally capable of providing sufficient voltage to power the AC motor 116 such that a vehicle may be operated at a relatively slow speed, the voltage provided to the AC motor 116 during periods of increased acceleration may need to be supplemented. In such instances, energy from energy battery 102 on low-voltage side 202 of multi-channel bi-directional boost converter 106 is utilized to provide the voltage necessary for increased acceleration of the vehicle. Energy from energy battery 102 is used when the State of Charge (SOC) of high specific-power energy storage device 104 is depleted below some predetermined minimum value, typically a value below the voltage of battery 102. When the SOC of high specific-power energy storage device 104 reaches this predetermined minimum value, a uni-directional coupling device 122 conducts such that the multi-channel bi-directional boost converter 106 extracts energy primarily from energy battery 102 using two channels of the multi-channel bi-directional boost converter 106, thereby allowing approximately twice the rated power compared to a single channel of the multi-channel bi-directional boost converter 106. Uni-directional coupling device 122 is shown to be a diode in the embodiment of FIG. 1, but it is to be understood that uni-directional conducting apparatus 122 could be implemented using other known components and circuit techniques. Such a configuration acts to facilitate increasing the operation speed of the vehicle, particularly when the available energy of high specific-power energy storage device 104 is depleted or near a predetermined voltage limit.

In the event high specific-power energy storage device 104 is at a relatively low SOC or low voltage, voltage from energy battery 102 can be boosted to the high side DC links 118 and 120 via low side (channel "a") of multi-channel bi-directional boost converter 106 through positive bus 110. The voltage provided by energy battery 102 through positive bus 110 and/or high specific-power energy storage device 104 through a positive bus 220 is "boosted," or increased, via the multi-channel bi-directional boost converter 106 by a boost ratio typically greater than 2:1. In this way, even with the output capabilities of energy battery 102 and/or high specific-power energy storage device 104, the voltage and power needed to accelerate AC motor 116 may be provided due to the voltage-boosting capabilities of multi-channel bi-directional boost converter 106. In addition, energy from the energy battery 102 may be utilized to charge one or both of high specific-power energy storage device 104 and energy storage device 112 simultaneously via multi-channel bi-directional boost converter 106.

While the operation of multi-channel bi-directional boost converter 106 may be sufficient under normal operating conditions (e.g., low acceleration and/or deceleration), the efficiency of multi-channel bi-directional boost converters such as multi-channel bi-directional boost converter 106 may degrade during high acceleration or deceleration of the vehicle. That is, as there is an increase in the ratio of voltage required to sufficiently power an AC motor versus voltage available on the respective low voltage sides of the multi-channel bi-directional boost converter, a multi-channel bi-directional boost converter may experience increased electrical loss, leading to thermal cycling stresses due to an increase in electrical current through components of the multi-channel bi-directional boost converter. These increased currents may lower the efficiency of the bi-directional boost converter, which require proper thermal design and hardware to dissipate the heat from these losses in the power electronic components. However, the embodiment shown in FIG. 1 addresses this issue to greatly improve the efficiency of system 100, especially during operation at relatively high power, high speed vehicle acceleration and deceleration.

Specifically, the positive terminal 210 of high specific-power energy storage device 104 is coupled in series with the negative terminal 216 of energy storage system 112 via a series link 124. Series link 124 bypasses one channel of multi-channel bi-directional boost converter 106 to enable the voltage outputs of high specific-power energy storage device 104 and energy storage device 112 to be summed, thereby utilizing the high specific-power characteristics of high specific-power energy storage device 104 and energy storage device 112. During motoring events such as pulsed loads, steady state loads, vehicle cruise, and vehicle acceleration, the combined voltage of these two energy storage devices can be used to provide sufficient voltage and power to AC motor 116 without incurring losses related to passing current through multi-channel bi-directional boost converter 106. Additionally, coupling high specific-power energy storage device 104 and second energy storage device 112 in series enables fewer battery cells to be used as compared to conventional traction battery systems having one or more traction batteries directly coupled to a DC link of an inverter or load, thereby reducing cost, weight, balancing, and reliability issues.

In addition to providing increased power capabilities for acceleration of the motor, the series connection of high specific-power energy storage device 104 and energy storage device 112 also provides for greater efficiency for energy capture during regenerative braking events. Unlike energy battery 102, both high specific-power energy storage device 104 and energy storage device 112 are operable at a low SOC and are capable of rapid high power electrical charge acceptance. As such, these energy storage devices are capable of accepting much of the regenerative power from the high voltage regenerated energy generated by AC motor 116 during overhauling loads such as vehicle deceleration. During such regenerative braking events, regenerative energy can be efficiently stored in high specific-power energy storage device 104 and energy storage device 112, again without incurring the losses associated with the limitations of multi-channel bi-directional boost converter 106, as series link 124 enables the bypass of multi-channel bi-directional boost converter 106. The energy stored in high specific-power energy storage device 104 and energy storage device 112 can then be used for subsequent accelerations, which again improves the overall efficiency of the entire propulsion system 100.

Yet another advantage to the exemplary embodiment of FIG. 1 is the ability to dynamically control the energy levels provided to and from the energy storage devices. Multi-channel bi-directional boost converter 106 is operable as an Energy Management System (EMS) to adaptively control these energy levels based on parameters such as vehicle speed, AC traction drive torque demand, AC traction drive speed, and various electrical characteristics of the energy storage units, such as SOC, voltage levels, state of health, and temperature. For example, such dynamic control enables multi-channel bi-directional boost converter 106 to independently control the amount of energy supplied by high specific-power energy storage device 104 and/or energy battery 102 during typical vehicle acceleration. Likewise, during deceleration, multi-channel bi-directional boost converter 106 operates to control the amount of regenerated energy provided to energy storage device 112, high specific-power energy storage device 104, and/or energy battery 102 to maximize the overall charge acceptance of the system. Such dynamic control greatly improves the overall efficiency of system 100.

Figure 2:
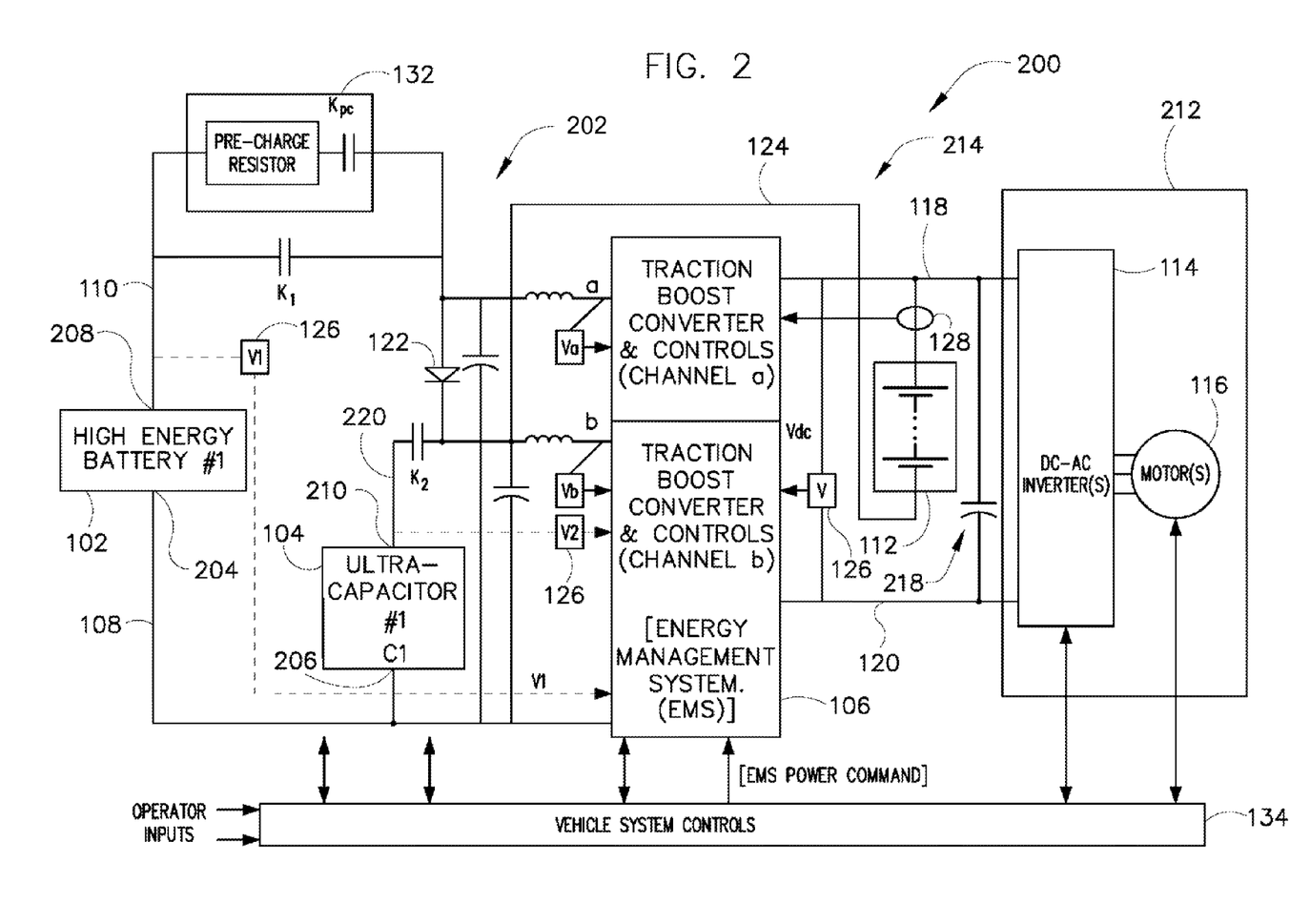
FIG. 2 schematically illustrates another embodiment of the propulsion system.

FIG. 2 illustrates another embodiment of the invention. Propulsion system 200 shown in FIG. 2 includes components similar to components shown in system 100 of FIG. 1, and thus numbers used to indicate components in FIG. 1 will also be used to indicate similar components in FIG. 2. As shown, system 200 includes the components of system 100, along with additional components such as a plurality of voltage sensors 126, a current sensor 128, a pre-charge circuit 132, and a Vehicle System Control (VSC) 134. Pre-charge circuit 132 acts to provide an initial pre-charge to a DC link filter capacitor 218 associated with DC-AC Inverter 114, plus other filter and energy storage capacitors associated with the EMS during vehicle start-up. Commands for such a vehicle start-up come from VCS 134, which receives operator inputs such as start-up, acceleration, and deceleration, and controls the operation of system 200 accordingly. It is to be understood that energy battery 102, high specific-power energy storage device 104, multi-channel bi-directional boost converter 106, and energy storage device 112 of system 200 may be operated similarly to that described above with respect to system 100. Alternatively, energy battery 102 may be removed from the first energy storage system, thereby making high specific-power energy storage device 104 the only energy storage device on low-voltage side 202 of system 200. Such a configuration would primarily be used in hybrid-electric drive-train configurations, wherein a heat engine (not shown) could supplement the energy provided via the first energy storage system and the second energy storage system.

Figure 3:
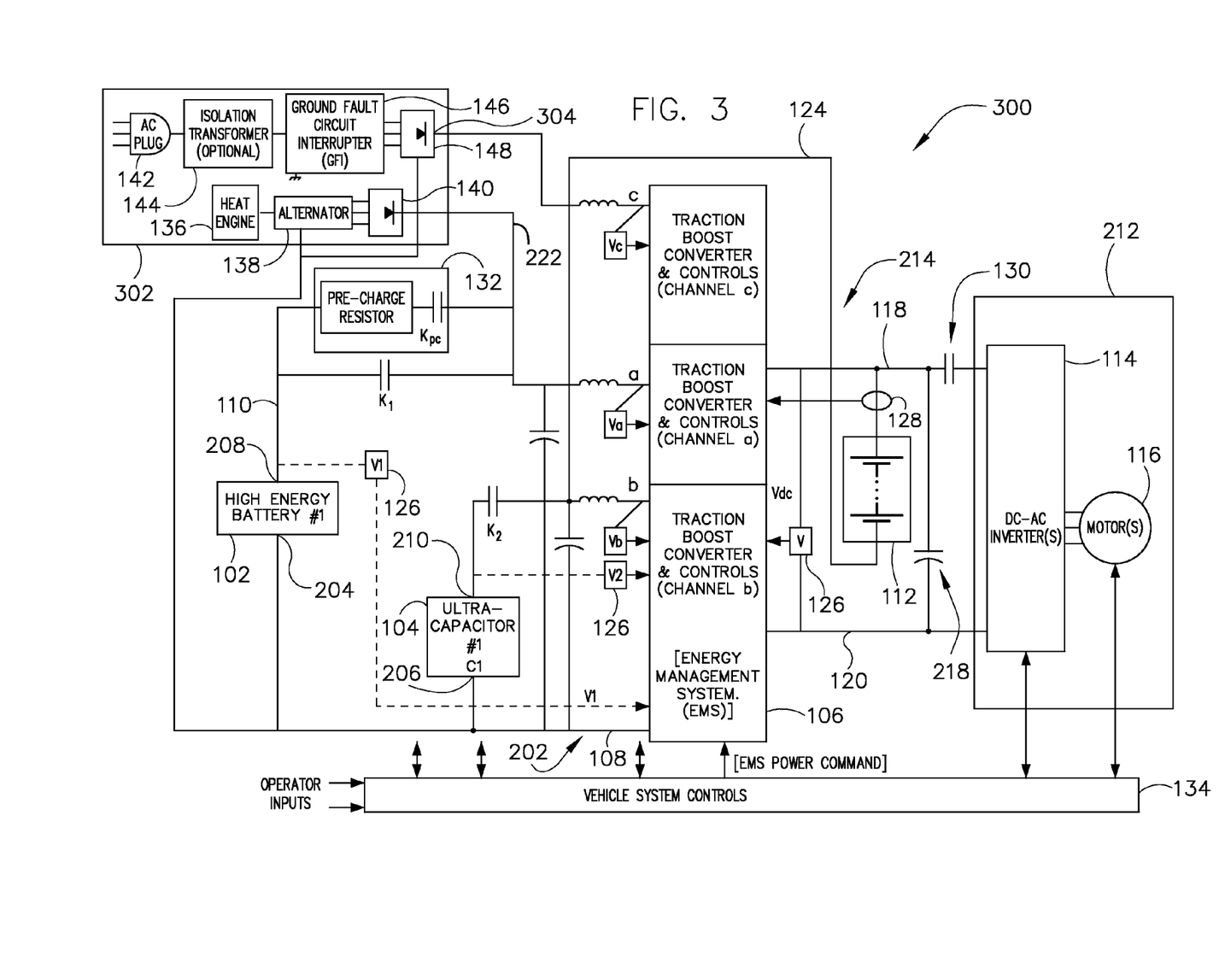
FIG. 3 schematically illustrates another embodiment of the propulsion system.

FIG. 3 illustrates yet another embodiment of the invention. Propulsion system 300 shown in FIG. 3 includes components similar to components shown in systems 100 and 200 of FIGS. 1 and 2, and thus numbers used to indicate components in FIGS. 1 and 2 will also be used to indicate similar components in FIG. 3. As shown, system 300 includes an auxiliary power unit 302 on low-voltage side 202 of multi-channel bi-directional boost converter 106. Auxiliary power unit 302 comprises a heat engine 136, an alternator 138, and a rectifier 140. Auxiliary power unit 302 of system 300 also includes a plug-in electrical system comprising an AC plug 142, an isolation transformer 144, a Ground Fault Current Interrupter (GFI) 146, and a rectifier 148. The output of rectifier 140 is coupled to bus 222 such that energy produced by heat engine 136 and alternator 138 may supplement the energy provided by high specific-power energy storage device 104, and/or energy battery 102. Furthermore, when heat engine 136 is operating, energy battery 102, high specific-power energy storage device 104, and energy storage device 112 selectively may be recharged using energy provided via heat engine 136, alternator 138, and rectifier 140. Control of the current, voltage, and power is controlled during recharge operation via VSC 134 and the EMS.

Alternatively, when energy battery 102, high specific-power energy storage device 104, and energy storage device 112 are not being used to operate motor 116, AC plug 142 may be coupled to an external electrical power source (i.e., the utility grid) to supply energy through rectifier 148 to the energy storage devices 102, 104, 112 in system 300. The output 304 of rectifier 148 is coupled through an inductor to a separate channel (e.g., channel "c") of multi-channel bi-directional boost converter 106 such that voltage, current, and power from the external electrical power source is controlled and is capable of being provided to any of energy battery 102, high specific-power energy storage device 104, and energy storage device 112 in system 300. In FIG. 3, a contactor 130 acts to prevent enablement of DC-AC inverter 114 during charging of energy battery 102, high specific-power energy storage device 104, and energy storage device 112 when the system is plugged into an electric utility interface via AC plug 142. While contactor 130 is shown between energy storage device 112 and DC-AC inverter 114, contactor 130 may be located elsewhere in system 300, including each phase on AC motor 116. Accordingly, when incorporated into a vehicle, system 300 shown in FIG. 3 is not only capable of energy recharge via heat engine 136 while under operation, but can also be recharged when the vehicle is not in use.

Unlike systems 100 and 200 respectively shown in FIGS. 1 and 2, system 300 illustrated in FIG. 3 is shown without a uni-directional coupling device (e.g., a diode) between energy battery 102 and high specific-power energy storage device 104. Without such a uni-directional coupling device, high specific-power energy storage device 104 may be discharged to a value substantially lower than the voltage of energy battery 102. In this way, the efficiency of system 300 during operation of AC motor 116 at low speed and low power is greatly improved.

Figure 4:
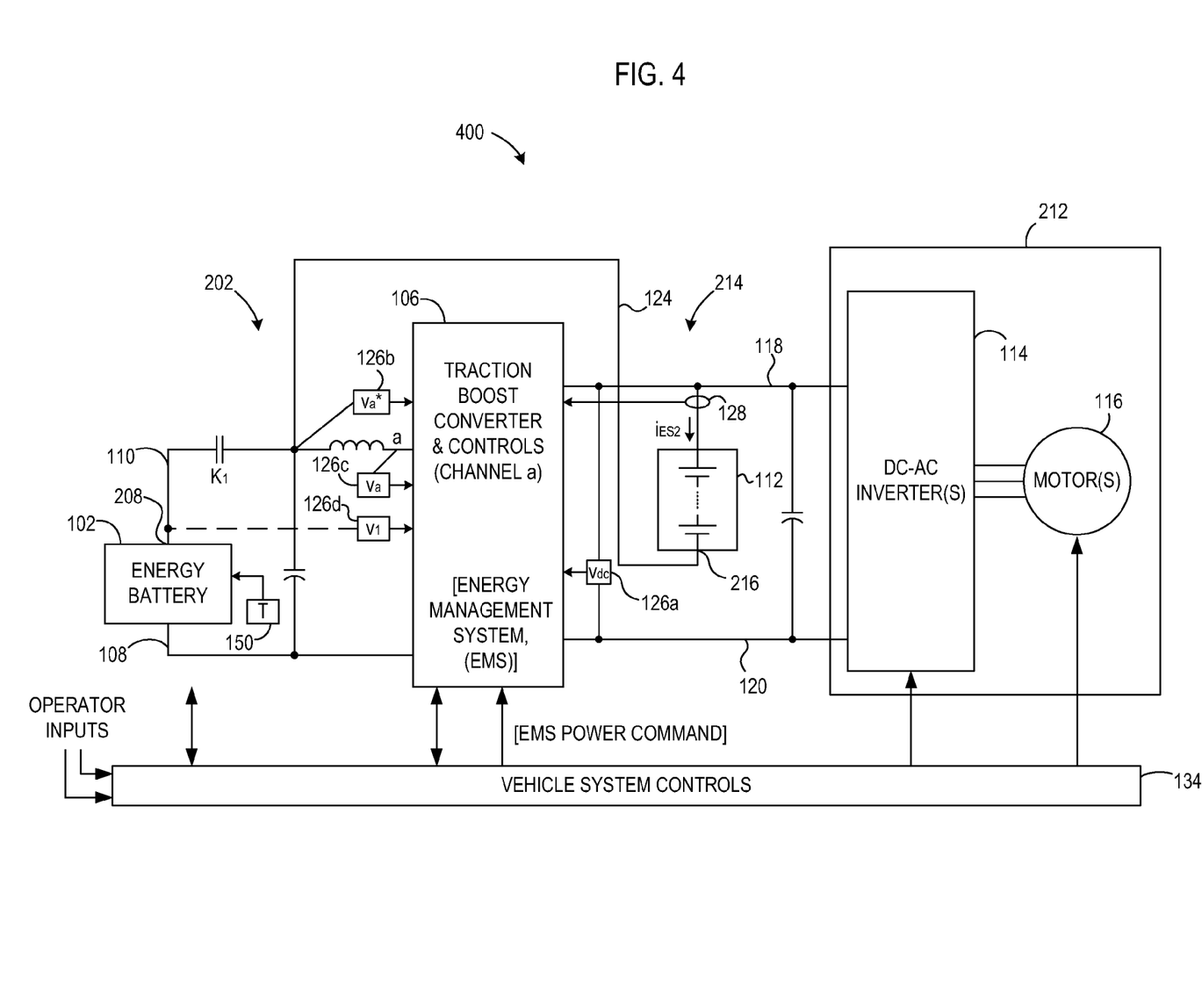
FIG. 4 schematically illustrates another embodiment of the propulsion system.

FIG. 4 illustrates yet another embodiment of the invention. Propulsion system 400 shown in FIG. 4 includes a number of components similar to components shown in systems 100, 200, and 300 of FIGS. 1-3, and thus numbers used to indicate similar components in FIGS. 1-3 will also be used to indicate similar components in FIG. 4. In this embodiment and in embodiments shown in FIGS. 5-7, the term energy battery describes a high impedance, low specific-power battery. Using a high impedance, low specific-power battery instead of a low impedance, high specific-power battery results in a lower-cost electric propulsion system. The use of such low specific-power energy storage systems according to embodiments of the invention extends device life, reduces DC link voltage drop, improves system efficiency, and improves vehicle range by a combination of reducing the power demand from the first (low specific-power) energy storage system and by increasing regenerative energy capture, especially in the high specific-power energy storage unit such as energy storage device 112.

As illustrated, propulsion system 400 shows series link 124 coupled to channel "a" of boost converter 106. In this manner, energy battery 102 is configured to be coupled in series with energy storage device 112. In this embodiment, a second energy storage device such as high specific-power energy storage device 104 is not shown as being connected to boost converter 106. Accordingly, boost converter 106 may be a single channel boost converter in this embodiment. However, it is contemplated that boost converter 106 may be a multi-channel bi-directional boost converter as described in other embodiments herein. Energy battery 102 is preferably a high specific energy storage device having a relatively high resistivity and impedance as compared with energy storage device 112. In addition, propulsion system 400 is preferably configured such that first energy storage system 102 has a lower voltage than second energy storage system 112. In one embodiment, the voltage of energy storage device 112 is a factor of three or greater higher than the voltage of energy battery 102.

As shown, energy battery 102 and energy storage device 112 are coupleable together in series on the DC link 118 via series link 124. A coupling device (K1) such as a contactor is coupled to bus 110 and, when coupling device K1 is closed, is configured to couple positive terminal 208 of energy storage system 102 in series with a negative terminal 216 of energy storage device 112. When open, contactor K1 decouples energy battery 102 from series link 124. As shown, link 124 bypasses boost converter 106 to enable the voltage outputs of energy storage systems 102, 112 to be summed. By connecting energy storage systems 102, 112 in series, the power sharing between energy storage systems 102, 112 is a function of the relative voltages of the two energy storage systems, rather than being based on the relative resistance of the energy storage systems, as is the case in propulsion systems where the energy storage units are arranged in hard parallel.

During motoring events such as pulsed loads, steady state loads, vehicle cruise, and vehicle acceleration, the combined voltage of energy storage devices 102, 112 may be used to provide sufficient voltage and power to AC traction drive 212 without incurring losses related to passing current through boost converter 106. During regenerative braking events, regenerative energy can be efficiently stored in energy storage devices 102, 112, again without incurring the losses associated with the limitations of boost converter 106, as series link 124 enables the bypass of boost converter 106. The energy stored in energy storage devices 102, 112 can then be used for subsequent accelerations, which again improves the overall efficiency of the entire propulsion system 400.

In one embodiment, the energy management system operation of boost converter 106 maintains the SOC of energy storage device 112 at a mid-range value (e.g., such as at a value between 40 and 70 percent SOC) during operation of propulsion system 400 to allow stored energy to be used during acceleration events and to allow regenerative braking energy to be stored therein, for example. Energy from energy battery 102 may also be used to recharge energy storage device 112 during non-regenerative braking events to increase its SOC as needed.

During regenerative braking events when power is supplied to DC link 118, 120 from DC-AC inverter 114, the energy management system operates in a closed-loop power mode to control the power into energy storage devices 102 and 112. In this mode, VSC 134 is configured to generate and send an EMS power command (EMSa*) to the EMS to control charging of energy storage devices 102 and 112 from the regenerative braking power. The regenerative braking power through energy storage device 112 ($P_{ES2}$) may be calculated by multiplying a current flowing into energy storage device 112 by a voltage of energy storage device 112. The current ($i_{ES2}$) flowing into energy storage device 112 may be measured by current sensor 128, and the voltage of energy storage device 112 may be determined by subtracting a DC link voltage ($V_{dc}$) measured via voltage sensor 126a by a voltage ($V_a*$) measured via voltage sensor 126b. EMSa* may then be calculated using the equation EMSa*=−($P_{ES2}$−$P_{ES1}$), where $P_{ES1}$<$Threshold_1$ is the desired power for regenerative power into energy battery 102, where $Threshold_1$ is a maximum amount of power deliverable to energy battery 102 within its energy rating limits for a given value of State-of-Charge (SOC). If $Threshold_1$ is equal to zero, then the regenerative power into energy battery 102 is also zero. The regenerative power into energy battery 102 may also be regulated while its temperature is within a defined range. The temperature of energy battery 102 may be measured via a temperature sensor 150. For example, if the temperature of energy battery 102 is above a high temperature threshold, the EMS may cause a contactor K1 to open to eliminate further heating thereof by way of regenerative braking power. Likewise, if the temperature of energy battery 102 is lower than a low temperature threshold, the EMS may cause a contactor K1 to open to prevent damage to energy battery 102 by recharging the unit below a specified minimum temperature for recharging.

If the value for $P_{ES1}$ is greater than zero during regenerative braking, the EMS causes contactor K1 to close or to remain in a closed position such that the regenerative power may flow into energy battery 102. When the EMS power command indicates that the regenerative power into energy battery 102 should be zero, the EMS causes contactor K1 to open. When contactor K1 is open, the EMS may control channel "a" of boost converter 106 to allow regenerative braking energy to flow through energy storage device 112 to fully charge energy storage device 112.

Figure 5:
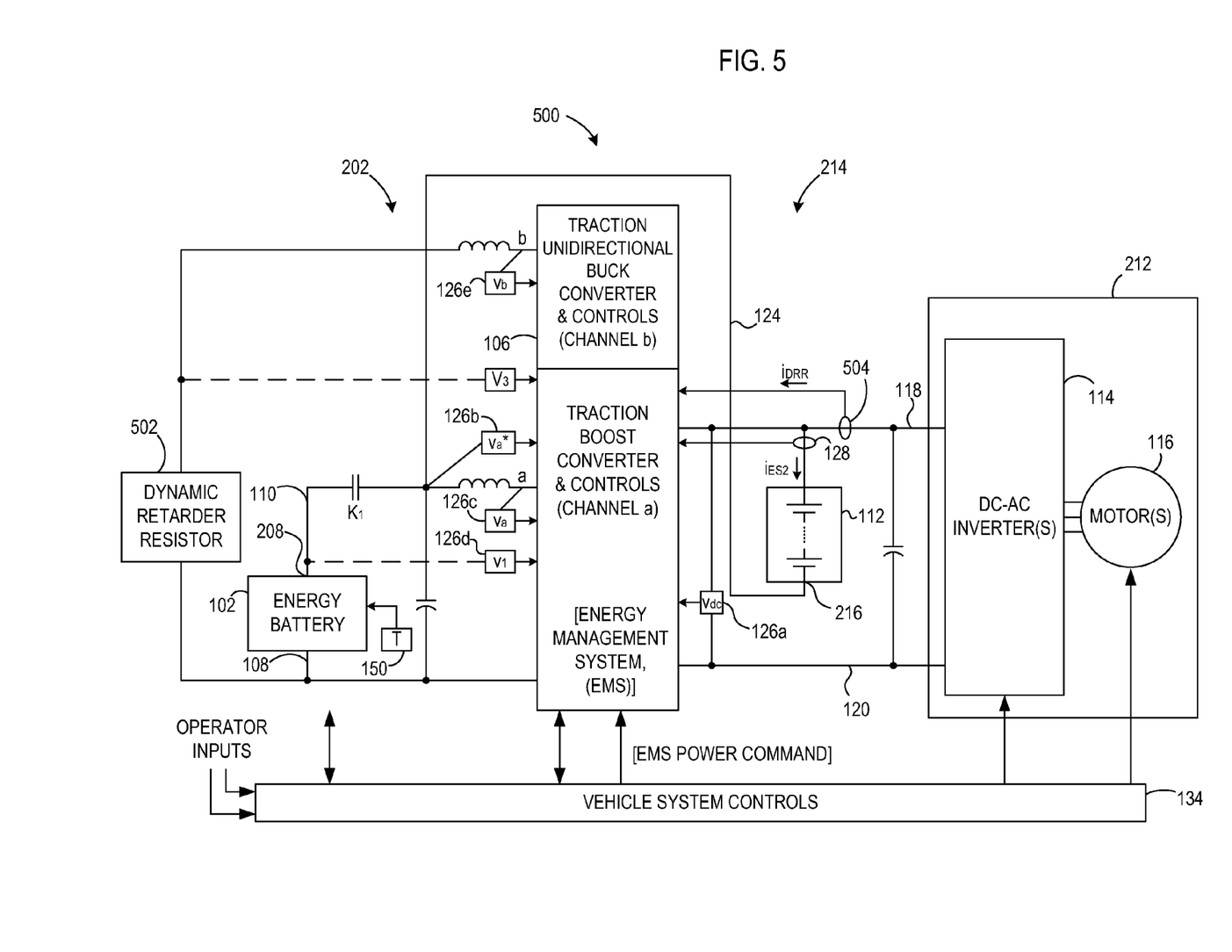
FIG. 5 schematically illustrates another embodiment of the propulsion system.

FIG. 5 illustrates another embodiment of the invention. Propulsion system 500 shown in FIG. 5 includes the components shown in system 400 and additionally includes a second channel (channel "b") on boost converter 106 that is configured to control regenerative braking power on DC link 118, 120 that is in excess of the availability of energy storage devices 102, 112 to store energy. As shown, channel "b" of boost converter 106 may be a uni-directional buck converter channel transferring regenerative power to an energy dissipation device such as dynamic retarder resistor assembly 502 having one or more power resistors configured to dissipate the excess regenerative power. As a uni-directional buck converter channel, channel "b" operates as a DC chopper and is configured to use only one of two power electronic switches (not shown) normally utilized in a full-phase, bi-directional boost converter module. In addition to the power electronic switch, a diode (not shown) is also included and coupled in anti-parallel with the power electronic switch. While shown as a uni-directional channel, it is contemplated that channel "b" may be a bi-directional boost converter channel similar to channel "a".

The EMS may monitor and calculate the power flow in the DC link by measuring the current ($i_{DRR}$) flowing in DC link 118, 120 and multiplying the DC current $i_{DRR}$ by the value of DC link voltage as measured in sensor 126a. By measuring the DC current $i_{DRR}$ from current sensor 128 and the voltage $V_a*$ in sensor 126b plus the current into channel "a" of traction boost converter, as described above, the regenerative power being supplied to energy storage unit 112, and 102 in the case when contactor K1 is closed, can be determined as described above. In the case when contactor K1 is open, the regenerative power flowing into energy storage unit 102 is zero. DC link regenerative power that is in excess to what is being delivered to energy storage unit 112 and 102 can be dissipated in the dynamic retarder resistor 502 via control of the EMS power command at channel "b" of the unidirectional buck converter.

Figure 6:
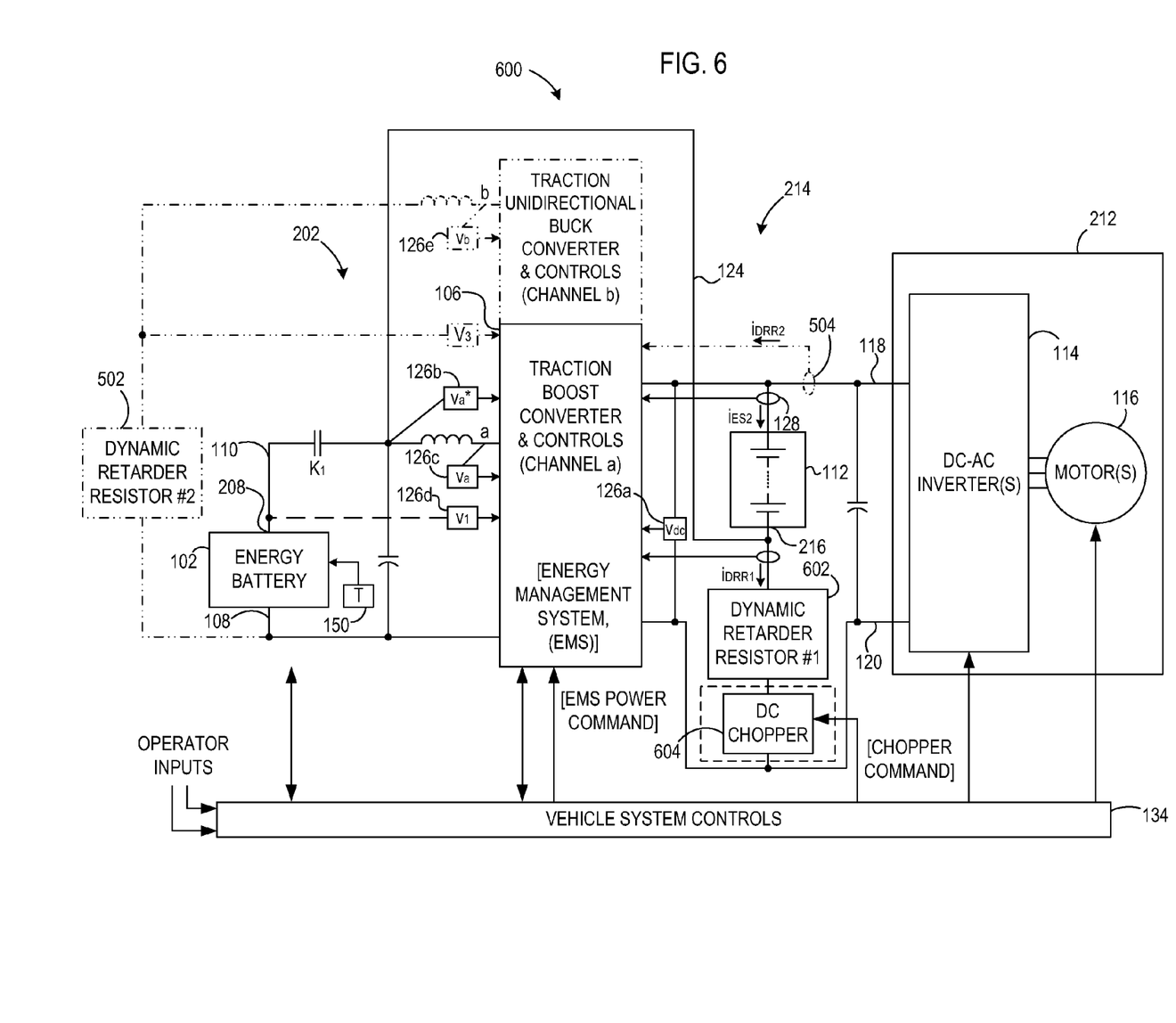
FIG. 6 schematically illustrates another embodiment of the propulsion system.

FIG. 6 illustrates another embodiment of the invention. Propulsion system 600 shown in FIG. 6 includes the components shown in system 400 and additionally includes an energy dissipation assembly including a dynamic retarder resistor assembly 602 and a DC chopper 604 coupled to negative terminal 216 of energy storage device 112. While the dynamic retarder resistor #1 assembly 602 is illustrated as being directly coupled to negative terminal 216, it is contemplated that DC chopper 604 may instead be directly coupled to negative terminal 216 while dynamic retarder resistor assembly 602 may be coupled to DC chopper 604 and to negative DC link 120.

In contrast to the operation of dynamic retarder resistor assembly 502 and channel "b" of boost converter 106 of FIG. 5, dynamic retarder resistor assembly 602 and DC chopper 604 are controlled to allow continued regenerative braking power flow through energy storage device 112 when the SOC of energy storage device 112 is less than its maximum threshold and when contactor K1 has been opened to discontinue the recharging of energy battery 102 via regenerative braking power. In this manner, the amount of regenerative energy captured in energy storage 112 may be increased as compared with the case where the energy storage system 102 is at a relatively high level of SOC and K1 is closed, or in the case when K1 is in the open state and zero regenerative energy is flowing into energy storage 102. In another case, when K1 is open, the configuration shown in FIG. 6 may allow increased regenerative current to flow through energy storage unit 112 through the relatively low cost, high current rated DC chopper circuit as compared with the circuit in FIG. 5, where the regenerative power may be limited by the current and power rating of channel "a" of the boost converter. VSC 134 is configured to deliver a chopper command to DC chopper 604 to control the amount of power flowing into energy storage device 112. The chopper command may be based, at least in part, on the power $P_{ES2}$ flowing through energy storage device 112 and on a threshold of the desired or maximum SOC of energy storage device 112.

As shown in phantom, dynamic retarder resistor assembly 502, current sensor 504, and channel "b" of boost converter 106 may be optionally included to measure and control dissipation of regenerative braking energy on DC link 118 when the SOC of energy storage devices 102, 112 have reached their desired or maximum values and/or the energy storage devices 102, 112 have reached their desired or maximum voltage levels.

Figure 7:
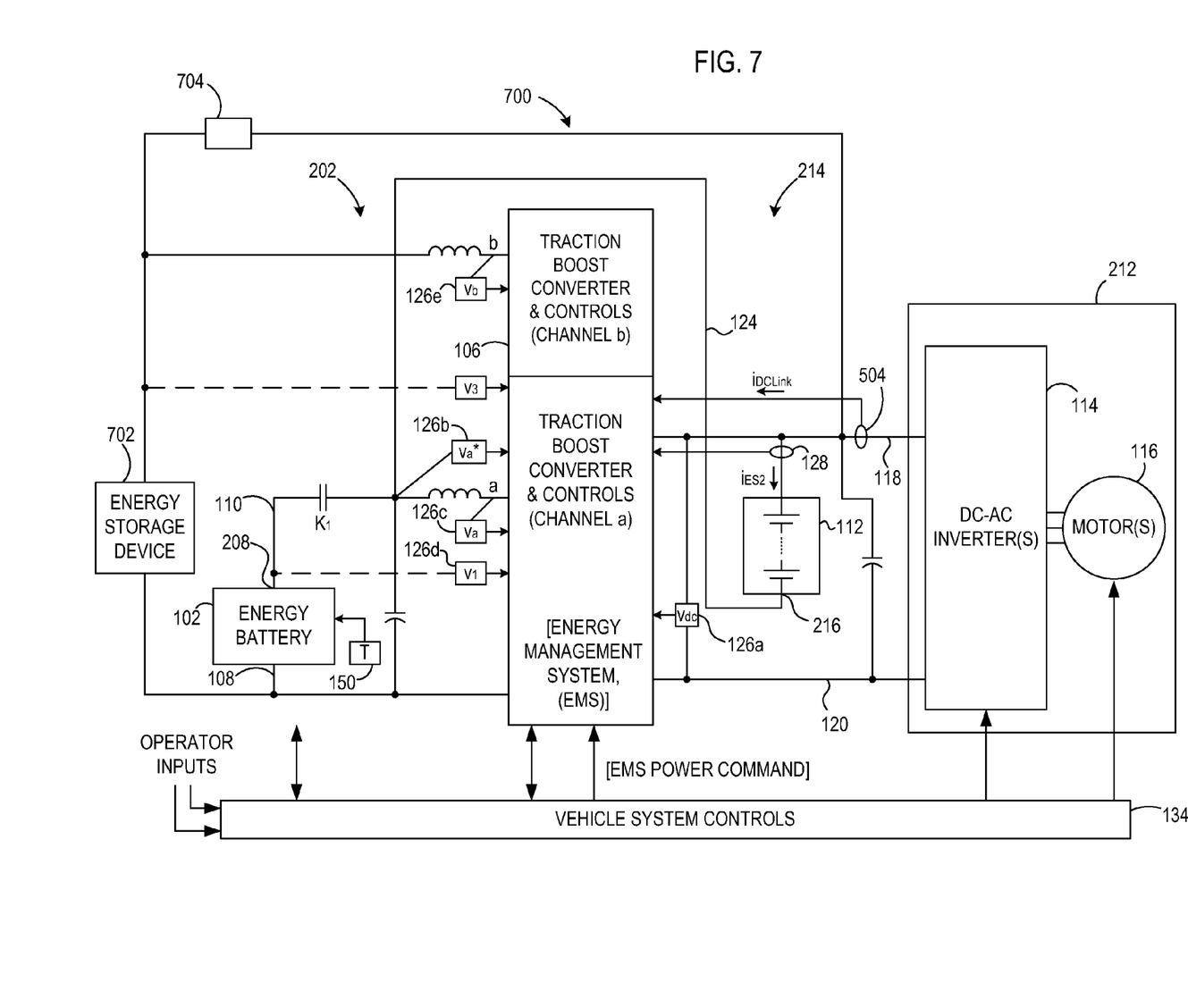
FIG. 7 schematically illustrates another embodiment of the propulsion system.

FIG. 7 illustrates another embodiment of the invention. Propulsion system 700 shown in FIG. 7 includes the components shown in system 400 and additionally includes a second, bi-directional buck/boost channel (channel "b") on boost converter 106 coupled to an energy storage device 702 also included in the second energy storage system. Energy storage device 702 may have a different chemistry then either of energy storage devices 102, 112. In addition, energy storage device 702 may be a battery in one embodiment or may be an ultracapacitor in another embodiment having multiple capacitor cells coupled to one another, where the capacitor cells may each have a capacitance that is greater than 500 Farads. In yet another embodiment, energy storage unit 702 may be a flywheel energy storage system (not shown). Energy storage device 702 may be used during operation to assist in acceleration as well as to accept and store regenerative braking power to DC link 118. In one embodiment, where for example energy storage unit 702 is a battery, the maximum operating voltage and impedance of energy storage device 702 is higher than the series-combined energy storage devices 102, 112, while the nominal operating voltage of energy storage device 702 may be less than the series-combined energy storage devices 102, 112. In another embodiment where energy storage unit 702 is an ultracapacitor, the maximum voltage rating during charging operation of the ultracapacitor energy storage is higher than the voltage rating of the series-combined energy storage devices 102, 112.

A high-current coupling device 704 may be coupled between DC link 118 and energy storage device 702 to allow regenerative braking power to be delivered to energy storage device 702 while bypassing channel "b" of boost converter 106. In one embodiment, coupling device 704 may be a high-power diode poled from DC link 118 to the positive side of energy storage device 702. In another embodiment, coupling device 704 may be a contactor with sensors configured to activate the contactor during periods of heavy regenerative braking power. In an example, during a condition of heavy regenerative power being generated on DC link 118, the EMS may cause contactor K1 to open such to allow the voltage on DC link 118 to increase to a voltage higher than the maximum allowed voltage of the series-combined energy storage devices 102, 112. The increased voltage then flows through coupling device 704 and is stored in energy storage device 702. When the regenerative braking power being generated on DC link 118 reduces to a level suitable for charging either or both of energy storage devices 102, 112, coupling device 704 may decouple the bypassed connection of DC link 118 to energy storage device 702, the contactor K1 may be closed, and control of contactor K1 and boost converter 106 may be performed by the EMS as described herein to charge any or all of the energy storage devices 102, 112, 702. The ability to bypass boost converter 106 in order to charge energy storage device 702 may be well-suited to heavy-duty vehicle applications where 702 is a battery with relatively high impedance. If energy storage device 702 is an ultracapacitor, the voltage rating during charging of the ultracapacitor is a higher voltage rating than the sum of the voltage ratings of the series-combined energy storage devices 102, 112. In either case of a battery or an ultracapacitor utilized for energy storage device 702, high levels of regenerative braking power supplied to DC link 118 will be effectively captured and stored.

Although it is not shown in FIG. 7, it is contemplated that propulsion system 700 may incorporate either or both of the power dissipation embodiments shown in FIG. 6.

In accordance with one embodiment of the invention, a propulsion system includes an electric drive, a direct current (DC) link electrically coupled to the electric drive, and a first energy storage system electrically coupled to the electric drive, wherein the first energy storage system includes a low specific-power energy storage device. The system also includes a coupling device coupled to a first terminal of the low specific-power energy storage device and a second energy storage system, wherein a first terminal of the second energy storage system is electrically coupled to the electric drive through the DC link and a second terminal of the second energy storage system is coupled to the coupling device. A boost converter assembly is coupled to the first energy storage system and to the second energy storage system. The coupling device is configured to couple the second terminal of the second energy storage system to the first terminal of the low specific-power energy storage device in a series connection and the series connection bypasses the boost converter assembly.

In accordance with another embodiment of the invention, a method of assembling a control system includes coupling a low specific-power energy battery to a coupling device, coupling a second energy storage system to an electric drive through a direct current (DC) link, and coupling a boost converter to the coupling device, to the second energy storage system, and to the DC link. The method also includes connecting a terminal of the low specific-power energy battery in series with a terminal of the second energy storage system via the coupling device such that the connection between the terminal of the low specific-power energy battery and the terminal of the second energy storage system bypasses the boost converter when the coupling device is in a coupling state configured to couple the low specific-power energy battery to the second energy storage system.

In accordance with another embodiment of the invention, an energy storage arrangement for an electrically powered system includes a first energy storage system comprising at least a low specific-power energy storage device and a boost converter coupled to the first energy storage system via a coupling device on a low-voltage side of the boost converter. A second energy storage system coupled to the boost converter on a high-voltage side the boost converter is also included, wherein the second energy storage system is further coupled in a series connection with the low specific-power energy storage device via a coupling device such that the series connection between the second energy storage system and the low specific-power energy storage device bypasses the boost converter.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:
1. A propulsion system comprising:
an electric drive;
a direct current (DC) link electrically coupled to the electric drive;
a first energy storage system electrically coupled to the electric drive, the first energy storage system comprising a low specific-power energy storage device;
a coupling device coupled to a first terminal of the low specific-power energy storage device;

a second energy storage system, wherein a first terminal of the second energy storage system is electrically coupled to the electric drive through the DC link and a second terminal of the second energy storage system is coupled to the coupling device; and a boost converter assembly coupled to the first energy storage system and to the second energy storage system;

wherein the coupling device is configured to couple the second terminal of the second energy storage system to the first terminal of the low specific-power energy storage device in a series connection; and wherein the series connection bypasses the boost converter assembly.

2. The propulsion system of claim 1 wherein the low specific-power energy storage device comprises an energy battery.

3. The propulsion system of claim 1 wherein the low specific-power energy storage device and the second energy storage system are configured to receive regenerative energy during regenerative braking events associated with overhauling loads including vehicle deceleration.

4. The propulsion system of claim 3 wherein the boost converter assembly is configured to control an amount of regenerative energy transferred to the low specific-power energy storage device and to the second energy storage system during the regenerative braking events as a function of at least one of a vehicle speed, a state-of-charge of the low specific-power energy storage device, a state-of-charge of the second energy storage system, an electric drive torque demand, and an electric drive speed.

5. The propulsion system of claim 4 further comprising an energy dissipation device coupled to the boost converter assembly;

wherein the boost converter assembly comprises:
a bi-directional boost converter channel coupled to the low specific-power energy storage device; and
a uni-directional buck converter channel coupled to the energy dissipation device; and wherein the boost converter assembly is configured to control an amount of regenerative energy transferred to the energy dissipation device as a function of at least one of a state of charge of the low specific-power energy storage device, a state of charge of the second energy storage system, and a voltage of the DC link.

6. The propulsion system of claim 5 wherein the energy dissipation device comprises a power resistor configured to dissipate power flowing therethrough.

7. The propulsion system of claim 3 further comprising:
a controller configured to:
generate a power command based on a difference between a power flowing through the second energy storage system and a desired power flow into the low specific-power energy storage device; and
supply the power command to the boost converter assembly; and wherein the boost converter assembly is configured to control an amount of regenerative energy transferred to the low specific-power energy storage device and to the second energy storage system during the regenerative braking events based on the power command.

8. The propulsion system of claim 1 further comprising:
an energy dissipation device coupled to a DC chopper, wherein one of the energy dissipation device and the DC chopper is coupled to the first terminal of the second energy storage system; and
a controller configured to control the DC chopper when the low specific-power energy storage device is decoupled from the second energy storage system to charge the second energy storage system from a voltage on the DC link.

9. The propulsion system of claim 8 further comprising a second energy dissipation device coupled to the boost converter assembly;

wherein the boost converter assembly comprises:
a bi-directional boost converter channel coupled to the low specific-power energy storage device; and
a uni-directional buck converter channel coupled to the second energy dissipation device; and wherein the boost converter assembly is configured to control an amount of regenerative energy transferred to the second energy dissipation device as a function of at least one of a state of charge of the low specific-power energy storage device and a state of charge of the second energy storage system.

10. The propulsion system of claim 1 further comprising:
a high impedance energy storage device coupled to the low specific-power energy storage device;
a second coupling device coupled between the high impedance energy storage device and the DC link and configured to couple the high impedance energy storage device to the DC link such that a transfer of power from the DC link to the high impedance energy storage device bypasses the boost converter assembly; and
wherein the boost converter assembly comprises:
a first bi-directional boost converter channel coupled to the low specific-power energy storage device; and
a second bi-directional boost converter channel coupled to the high impedance energy storage device.

11. The propulsion system of claim 10 wherein the high impedance energy storage device comprises one of a battery, an ultracapacitor, and a flywheel system; and
wherein a voltage rating of the high impedance energy storage device is greater than a sum of a voltage rating of the first energy storage system with a voltage rating of the second energy storage system.

12. A method of assembling a control system comprising:
coupling a low specific-power energy storage system to a coupling device;
coupling a second energy storage system to an electric drive through a direct current (DC) link;
coupling a boost converter to the coupling device, to the second energy storage system, and to the DC link; and
connecting a terminal of the low specific-power energy storage system in series with a terminal of the second energy storage system via the coupling device such that the connection between the terminal of the low specific-power energy storage system and the terminal of the second energy storage system bypasses the boost converter when the coupling device is in a coupling state configured to couple the low specific-power energy storage system to the second energy storage system.

13. The method of claim 12 further comprising configuring the boost converter to manage a recharging of one of the low specific-power energy storage system and the second energy storage system using power supplied to the DC link during a regenerative braking event.

14. The method of claim 13 further comprising configuring the boost converter to switch the coupling device to a decoupled state to decouple the low specific-power energy storage system from the second energy storage system when a desired power flow into the low specific-power energy storage system is equal to zero.

15. The method of claim 13 wherein coupling the boost converter to the coupling device comprises coupling the coupling device to a first bi-directional boost converter channel of the boost converter; and
further comprising:
coupling a dynamic retarder resistor assembly to a first uni-directional buck converter channel of the boost converter; and
configuring the boost converter to buck the power supplied from the DC link via the first uni-directional buck converter channel to supply the bucked power to the dynamic retarder resistor assembly.

16. The method of claim 13 further comprising:
coupling an energy dissipation assembly to the second energy storage system, the energy dissipation assembly comprising:
a dynamic retarder resistor assembly; and
a DC chopper; and
configuring the boost converter to control the power flowing through the second energy storage system from the DC link via the energy dissipation assembly.

17. The method of claim 13 wherein coupling a boost converter to the coupling device comprises coupling the coupling device to a first bi-directional boost converter channel of the boost converter; and
further comprising:
coupling a third energy storage system to a second bi-directional boost converter channel of the boost converter;
coupling a second coupling device between the third energy storage system and the DC link such that a transfer of power from the DC link to the third energy storage system bypasses the boost converter when the second coupling device is in a coupling state configured to couple the third energy storage system to the DC link.

18. An energy storage arrangement for an electrically powered system, the arrangement comprising:
a first energy storage system comprising at least a low specific-power energy storage device;
a boost converter coupled to the first energy storage system via a coupling device on a low-voltage side of the boost converter; and
a second energy storage system coupled to the boost converter on a high-voltage side of the boost converter, wherein the second energy storage system is further coupled in a series connection with the low specific-power energy storage device via the coupling device such that the series connection between the second energy storage system and the low specific-power energy storage device bypasses the boost converter.

19. The energy storage arrangement of claim 18 further comprising a direct current (DC) link and an alternating current (AC) traction drive on the high-voltage side of the boost converter, wherein the boost converter and the second energy storage system are coupled to the AC traction drive through the DC link.

20. The energy storage arrangement of claim 19 wherein the boost converter is configured to manage a recharging of one of the low specific-power energy battery and the second energy storage system using power supplied from the DC link during a regenerative braking event.

21. The energy storage arrangement of claim 20 further comprising:
an energy dissipation assembly to the second energy storage system, the energy dissipation assembly comprising:
a dynamic retarder resistor assembly; and
a DC chopper; and
wherein the boost converter further comprises a control system configured to control the power flowing through the second energy storage system from the DC link via the energy dissipation assembly.

22. The energy storage arrangement of claim 20 further comprising:
a high impedance energy storage device coupled to the boost converter;
a second coupling device coupled between the high impedance energy storage device and the DC link and configured to couple the high impedance energy storage device to the DC link such that a transfer of power from the DC link to the high impedance energy storage device bypasses the boost converter assembly; and
wherein the boost converter assembly comprises:
a first bi-directional boost converter channel coupled to the low specific-power energy storage device; and
a second bi-directional boost converter channel coupled to the high impedance energy storage device.

23. The energy storage arrangement of claim 22 wherein the high impedance energy storage device comprises one of a battery, an ultracapacitor, and a flywheel system; and
wherein a voltage rating of the high impudence energy storage device is greater than a sum of a voltage rating of the first energy storage system with a voltage rating of the second energy storage system.

24. The energy storage arrangement of claim 20 further comprising:
an energy dissipation device coupled to the boost converter;
wherein the boost converter comprises:
a bi-directional boost converter channel coupled to the low specific-power energy storage device; and
a uni-directional buck converter channel coupled to the energy dissipation device; and
wherein the boost converter is configured to control an amount of regenerative energy transferred to the energy dissipation device as a function of at least one of a state of charge of the low specific-power energy storage device, a state of charge of the second energy storage system, and a voltage of the DC link.

* * * * *